United States Patent [19]
Appenzeller et al.

[11] 4,308,651
[45] Jan. 5, 1982

[54] CONTROLLED VARIABLE DEFLECTION ROLL

[75] Inventors: Valentin Appenzeller, Kempen; Karl-Heinz Ahrweiler, Krefeld, both of Fed. Rep. of Germany

[73] Assignee: Eduard Küsters, Krefeld, Fed. Rep. of Germany

[21] Appl. No.: 81,328

[22] Filed: Oct. 3, 1979

[30] Foreign Application Priority Data

Feb. 14, 1979 [DE] Fed. Rep. of Germany ....... 2905543

[51] Int. Cl.³ ............................................. B21B 13/02
[52] U.S. Cl. ............................................. 29/116 AD
[58] Field of Search ................... 29/116 AD, 113 AD

[56] References Cited
U.S. PATENT DOCUMENTS

| Re. 26219 | 6/1967 | Kusters et al. | 29/116 AD |
| 4,214,354 | 7/1980 | Lehmann | 29/116 AD |

FOREIGN PATENT DOCUMENTS 337456  5/1972  U.S.S.R. ........................ 29/116 AD

*Primary Examiner*—Peter P. Nerbun
*Attorney, Agent, or Firm*—Kenyon & Kenyon

[57] ABSTRACT

A controllable variable deflection roll of the type applying the deflection controlling force between the fixed shaft and the rotative shell via piston and cylinder arrangements, has the arrangements positioned offset circumferentially around the shaft with respect to the direction in which the deflection controlling force is applied.

11 Claims, 4 Drawing Figures

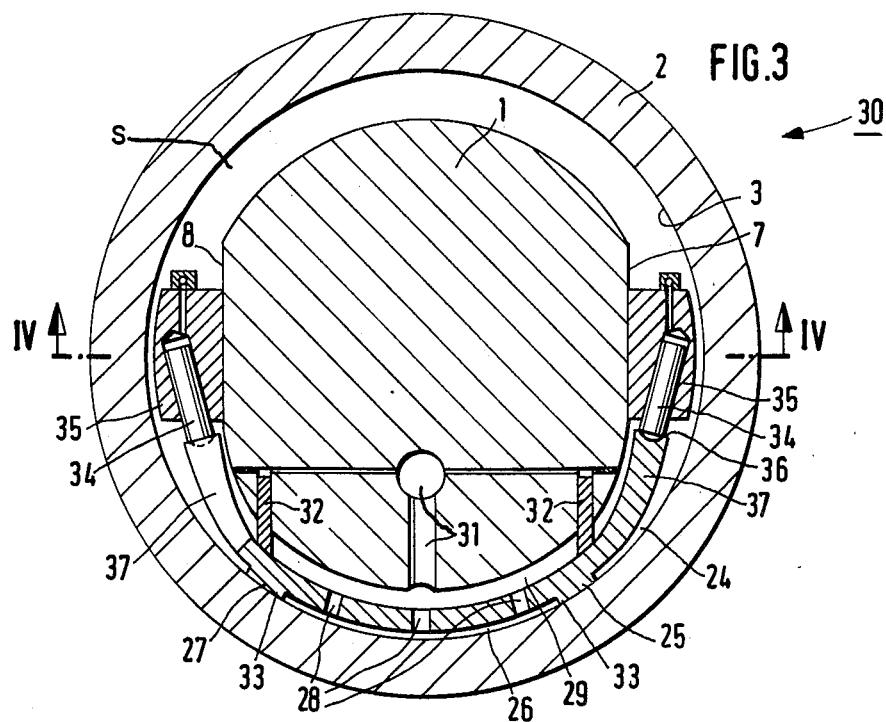
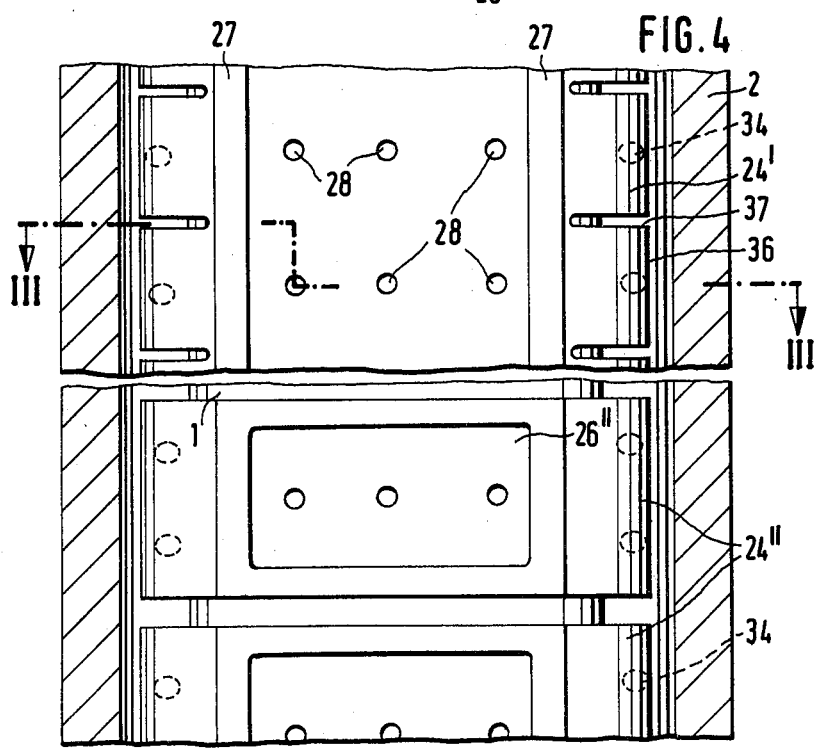

CONTROLLED VARIABLE DEFLECTION ROLL

BACKGROUND OF THE INVENTION

One kind of hydraulically controlled variable deflection roll is disclosed by the 1964 Kusters et al U.S. Pat. No. 3,131,625.

This roll comprises a rotative shell forming an external work-rolling surface and a cylindrical inside. A fixed shaft extends through the shell's inside with radial clearance permitting independent transverse deflection of the roll and shaft. The shaft has a longitudinally extending series of radially extending cylinders formed by blind bores in the shaft. Each cylinder contains a single reciprocating piston for applying the roll deflection force between the shaft and the shell via a bearing shoe bearing on the shell's cylindrical inside.

When in use with the roll rotating against a counterroll to form a nip through which flat work can be rolled, hydraulic pressure is introduced uniformly to the cylinders so their pistons force the shoes against the shell's inside to control the shell's contour. The reaction is carried by the shaft which functions as a beam and consequently bends under the beam stress it receives, whether the roll's controlled contour is straight or curved.

Excepting for the cylindrical bores and relatively small hydraulic liquid feed passages to the various cylinders, the fixed shaft is made of solid metal. Its maximum diameter is limited by the need for clearance between it and the shell's inside. The radial extent or depth of the bores affect the beam strength and stiffness of the shaft, so it is desirable to have the bores as short or shallow as possible. It has been necessary to make the cylinders formed by the bores, and their pistons, of large diameter to provide adequate roll deflection force without using abnormal hydraulic pressure.

It is common rule that to avoid a piston tilting or canting in its cylinder, the piston must have a guided length 1.5 times its diameter, necessarily requiring its cylinder to be substantially longer to accommodate the piston's working stroke. It follows that in the case of the described roll the bores forming the cylinders must extend undesirably far into the fixed shaft in its radial direction with a consequent undesirable reduction in the shaft's beam strength and stiffness.

The above rule can be satisfied without using such deep bores by using cylinders and pistons of much smaller diameter than has been usually contemplated, because it is possible to provide hydraulic pressures high enough for such arrangements to have the force necessary for them to be substituted for the larger diameter cylinders and pistons customarily proposed. Although abnormal pressures would be required, such pressures are technically attainable.

The above possibility, if reduced to practice, would require much better sealing between the pistons and their cylinders than is required when the larger diameters are used. As previously noted, the fixed shaft which functions as a beam carrying the reaction to the force applied to the shoes, bends under the beam stress it receives. The beam deflection or bending can be very substantial in some instances. For example, with large controlled deflection rolls having the dimensions commonly used to calender paper webs in a paper mill, the roll length may be in the area of 8 m long and the fixed shaft at its central portion may deflect as much as 20 mm under the beam stress it receives, and this is in the case of rolls designed with side seals so that the hydraulic pressure is applied to the working side of the fixed shaft throughout 180° of its circumference. The shaft can be made of solid steel and with a diameter that almost completely fills the inside of the rotative shell receiving the pressure. With such deflections, which would be exaggerated if the shaft were to be bored to form even very small diameter cylinders, the small cylindrical shapes would distort from true cylinders to slightly elliptical shapes preventing the necessary tight sealing between the pistons and the cylinders required by the high hydraulic pressures that would be required with the small diameter elements.

SUMMARY OF THE INVENTION

According to the present invention, a variable deflection roll having the rotative shell and fixed shaft with the radial clearance space extending around the shaft and permitting independent transverse bending of the shaft and shell, and with at least one bearing shoe in that space and between the shaft and shell's inside and bearing on this inside, is provided with cylinder and piston assemblies having diameters that are very small as compared to those previously contemplated. Therefore, abnormally high hydraulic pressures must be used to provide adequate shell deflection controlling force to the shoe. This means that each cylinder must be kept free from distortion to permit the sealing effectiveness required by the high hydraulic pressure.

To meet the above requirement, each assembly is offset circumferentially around the shaft from the direction of the control force the shoe applies to the inside of the shell, the offset preferably being around 90°.

To get the force from the offset cylinder and piston arrangement to the shoe, the shoe is made with portions which extend circumferentially in opposite directions in the clearance space and around the shaft, with each small diameter cylinder and piston arrangement being connected to the circumferential end of at least one of these portions, the other portion being braced by an abutment or, preferably, provided with a second of the cylinder and piston arrangements, positioned at the opposite circumferentially offset location.

Assuming that the roll is the upper roll working against a lower counterroll with the rolls forming a nip through which flat work, such as a paper web, is rolled or calendered, the shoe presses vertically against the shell's inside directly opposite to the nip, or bottom side of the roll, and the cylinder and piston arrangements are positioned substantially in a horizontal plane.

Preferably the small diameter cylinders are positioned by being fixed to the sides of the shaft at the offset positions, so they can be supplied with hydraulic pressure via conduits extending longitudinally with respect to the shaft to one end of the roll where they can be connected with a supply of hydraulic pressure of adequately high value for the pistons working in the cylinders.

In any event the cylinders are fixed to the shaft in the plane where the shaft bends the least when working or, in other words, at the level of its neutral axis below which the bending shaft is in compression and above which the shaft is in tension. Because the shaft bends in line with or in the plane of the force the shoes exert between the shaft and the shell, the clearance space required between the shaft and the shell's inside varies the least at the described offset positions. This permits the cylinder and piston arrangements to be designed for piston stroke lengths adequate to compensate for the shaft's deflection, particularly of importance at its central portion where its beam bending is greatest.

With the shaft normally cylindrical and possibly almost completely filling the space inside of the shell with the necessary clearance designed at its minimum possible value, the shaft can have its sides mounting the cylinders, flattened without materially reducing the shaft's beam strength and stiffness. Such flattening provides additional space for the cylinder and piston arrangements while facilitating connection of the cylinders to the shaft.

The invention is disclosed in more detail hereinafter with the aid of the accompanying drawings.

DESCRIPTION OF THE DRAWINGS

In these accompanying drawings several examples of controlled deflection rolls embodying the principles of the present invention are illustrated, the various figures being as follows:

FIG. 3 is a cross section taken on the line III—III in FIG. 4 and showing a third example; and FIG. 4 is a longitudinal section taken on the line IV—IV in FIG. 3.

DETAILED DESCRIPTION OF THE INVENTION

Figure 1:
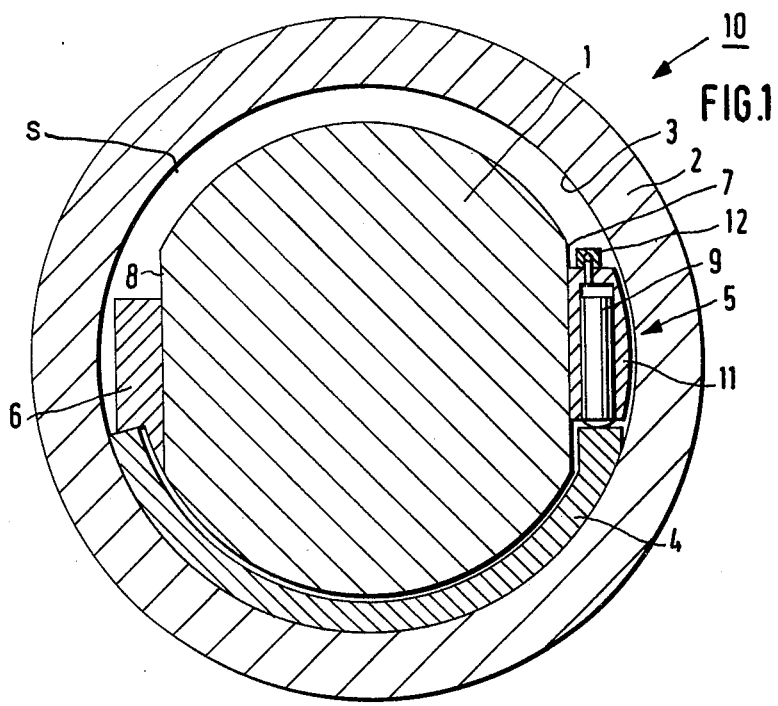
FIG. 1 is a cross section showing the first example.
Figure 2:
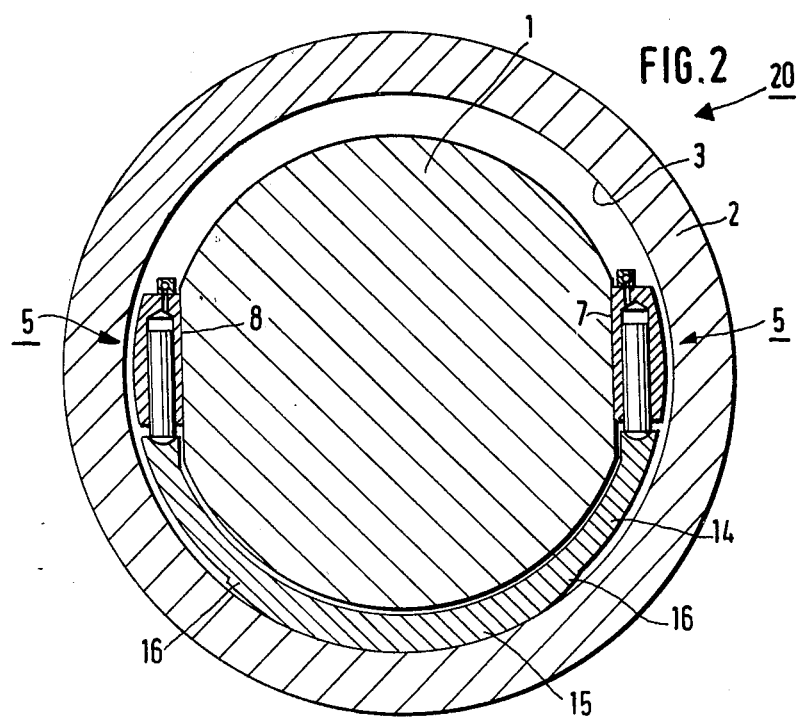
FIG. 2 is a cross section showing a second example.

In FIGS. 1 through 3 the roll shown in cross section can be the upper roll of a vertical roll set or stand. The roll would work against an unillustrated counter or lower roll which could be of the same construction or some other construction.

In FIG. 1 the roll 10 is shown with its fixed shaft 1 inside of its rotative shell 2 having a cylindrical inside surface 3 and with the clearance space indicated at S.

Although not illustrated, it is to be understood that as usual the fixed shaft 1 would have its ends mounted fixedly as by a suitable support or roll stand frame and that the ends of the shell 2 would be rotatively mounted by bearings mounted on the shaft's ends or possibly supported by the roll stand frame.

In any event, the space S permits independent bending or beam deflection of the shaft and shell relative to each other. If the unillustrated counterroll can be kept straight and free from beam deflection, the shell 2 would be kept straight, the deflection occurring then entirely on the part of the shaft 1. If the counterroll bends under the working pressure, the shell 2 should be correspondingly bent.

In FIG. 1 the previously described shoe 4 is arcuate and extends for substantially half the circumference of the shaft 1, one circumferential end of the shoe 4 being actuated by the small diameter cylinder and piston arrangement 5 on one side of the shaft, while its opposite end is positioned by an abutment 6 secured to the opposite side of the shaft.

To increase the radial extent of the space S, the shaft has flattened sides 7 and 8 which extend vertically parallel to the direction of the force exerted between the shaft 1 and shell 2, and it is to these flat sides that the abutment 6 is fixed at 8 with the piston 9 having its cylinder 11 fixed to the opposite flat side 7. Hydraulic pressure can be introduced to the top of the cylinder 11 above the piston 9 by a conduit 12 which extends lengthwise through the space S, to one outer end of the roll where it can be connected to a hydraulic pressure source of adequately high value.

It is to be understood that in FIG. 1, and this also applies to FIGS. 2 and 3, the system shown is one of a series that extends lengthwise in the space S from one end of the roll to the other. The piston and cylinder diameters are shown as very small relative to the overall size of the roll.

The shoe 4 works in circumferential compression to a large degree with its surface bearing on the shell's inside 3 so the shoe is capable of transmitting the roll deflection force required. At the same time, the shoe 4 has a relatively thin cross-section so that it has a degree of flexibility permitting it to conform with the inside 3 of the shell 2 if and when the shell's shape varies. For example, transverse bending of the shell 2 may be required to make its rolling surface conform to a bending counterroll.

Substantially the same construction is shown in FIG. 2 excepting that a second one of the cylinder and piston assemblies 5 replaces the abutment 6 in FIG. 1. Using two of such pressure elements, the piston stroke of each need only be half that required by the single element of FIG. 1. Normally all of the pressure elements would be connected in parallel to the source of hydraulic pressure. In FIG. 2 the shoe is throughout its active or effective bearing area thickened to form a distinct bearing shoe 15 which tapers at both its circumferential ends at 16 so that the space S can be provided with a liquid lubricant carried beneath the active bearing surface of the part 15 in the form of a lubricating film. The portions 14 which extend from the part 15 function to transmit the force of the pressure elements 5 to the surface of the active bearing shoe part 15.

The plain lubricated bearing 15 of FIG. 2 can be replaced by a hydrostatic bearing as shown in the case of the roll 30 of FIGS. 3 and 4.

In this case the shoe 24 can be substantially the same as in FIG. 2, but the bearing 25-27 is formed with a recess 26 thus forming a hydrostatic bearing pocket which can be supplied with pressurized lubricant via openings 28 extending from the pocket through and to the inside of the bearing. A lubricant chamber 29 is formed on the inside of the shoe's bearing 25-27 by seals 32 slidably mounted in slots formed in the shaft 1 and forming a dam surrounding the pocket outline. A lubricant feedline 31 is formed through the shaft 1 so as to feed pressurized lubricant via the roll's end to the chamber 29. The seals 32 are spaced apart from each other a greater distance than the extent of the hydrostatic bearing pocket which terminates at the locations 32, this resulting in a pressure differential causing the shoe's bearing 25-27 to be pressed towards the inside 3 of the shell 2, the pressure being dependent on the lubricant supply pressure.

In FIGS. 1 and 2 the cylinder and piston arrangements are oriented tangentially with respect to the inside 3 of the shell 2. In FIG. 3, as to each arrangement, the piston 34 and its cylinder 35 are oriented so as to angle inwardly, the working end of each piston 34 bearing on the circumferential ends of the circumferentially extending shoe via self-aligning bearings 36.

As previously indicated, the bearing shoes of this invention must be capable of flexing or deflecting or bending so as to follow the corresponding actions of the fixed shaft 1 and the rotative shell 2. To promote such flexibility without decreasing the shoe's circumferential rigidity, it is possible to form circumferentially extending cuts 37 which are axially interspaced to form a series and which extend from the force-receiving ends of the shoe possibly down almost to the shoe's active bearing portion which works against the inside 3 of the shell 2. It is also possible to use a number of individual shoes each provided with its own pair of cylinder and piston arrangements as indicated at 24' and 24" in FIG. 4, showing that each individual shoe can have a multiplicity of the cylinder and piston arrangements, the pistons being indicated in broken lines at 34 in FIG. 4.

Normally, the lubricant pressure in the spaces 29 and 26 of the hydrostatic bearing of FIG. 3 would be controlled to values required only for the hydrostatic bearing action, the pressures applied behind the various pistons of the cylinder and piston arrangements being used to control the roll's deflection or contour. However, it is conceivable that the lubricant pressures could be made so high as to solely thereby control the deflection of the shell 2 under some working conditions, and in such instances the cylinder and piston elements could be designed for operation so as to apply tension to the circumferential ends of the shoes and which would work counter to the shoe bearing pressure.

In all cases, the cylinder and piston and shoe arrangements would normally extend for the complete length of the roll.

What is claimed is:

1. A hydraulically controlled variable deflection roller adapted to be supported for rotation opposite a counter roll so as to apply a line of pressure at the nip formed between said deflection roll and said counter roll, comprising a rotative shell having an external rolling surface and a hollow cylindrical inside, a fixed shaft extending through said inside with a radial clearance space extending around the shaft; a pressure element for applying a force to the inside of said rotative shell at least in the area of said nip; and means operated by a fluid medium under pressure for applying a force to said pressure element, said means for applying disposed at the side of said fixed shaft at an angular position which is approximately 90° from the position of said nip, said means disposed so as to act between said pressure element and said fixed shaft.

2. The roll of claim 1 wherein said the pressure element comprises a bearing shoe extending between said means for applying force on one side and an abuttment on the other side of said fixed shaft.

3. The roll according to claim 2 wherein said abuttment comprises a further means for applying force.

4. The roll according to claim 2 wherein said bearing shoe is circumferentially rigid and longitudinally flexible.

5. A cylinder according to claim 3 wherein said bearing shoe has an outwardly raised bearing surface contacting the inside of said shell in the area of said nip, said shoe spaced from the inside of said shell over the remainder of its circumference.

6. The roll according to claim 5 and further including an enclosed recess formed in said outwardly raised bearing surface extending along the length thereof opposite said nip, and means to admit a pressure fluid medium to said recess.

7. A roll according to claim 6 and further including: a chamber on the side of said bearing shoe facing said shaft opposite said recess; a plurality of slidably mounted seals defining the sides of said chamber and maintaining a seal between said shaft and said bearing shoe as said shoe moves radially with respect to said shaft; passages coupling said recess and said chamber, the effective cross section of said recess being smaller than the cross section said chamber; and means for supplying a pressure fluid to said chamber, whereby said pressure fluid will also be supplied to said recess through said passages, but because of the difference in area between said chamber and said recess a net force toward said nip will result holding said shoe in contact with said shell and applying pressure thereto.

8. A roll according to claim 7 wherein said means for applying force are adapted to apply a tension to said bearing shoe.

9. A roll according to claim 2 wherein said bearing shoe is continuous over at the length of said shaft.

10. A roll according to claim 2 wherein said shoe contains cuts extending from its rim in the area adjacent to the pressure elements.

11. A roll according to claim 2 wherein a plurality of individual shoes are provided along the length of said shaft.

* * * * *